United States Patent [19]

Suzuki

[11] 3,831,700
[45] Aug. 27, 1974

[54] POWER STEERING MECHANISM
[75] Inventor: Akira Suzuki, Nishio, Japan
[73] Assignee: Aisin Seiki Kabushiki Kaisha, Kariya, Aichi, Japan
[22] Filed: Aug. 25, 1972
[21] Appl. No.: 283,718

[30] Foreign Application Priority Data
Aug. 25, 1971  Japan.............................. 46-64933
Aug. 26, 1971  Japan.............................. 46-65364

[52] U.S. Cl. ........................ 180/79.2 R, 91/447
[51] Int. Cl. ............................................. B62d 5/08
[58] Field of Search.......... 180/79.2 R; 91/446, 447, 91/448

[56] References Cited
UNITED STATES PATENTS
2,748,881  6/1956  Holley............................ 180/79.2 R
2,893,505  7/1959  Schultz........................... 180/79.2 R
3,692,137  9/1972  Inoue............................. 180/79.2 R
3,693,747  9/1972  Nishikawa....................... 180/79.2 R

*Primary Examiner*—Robert J. Spar
*Assistant Examiner*—Leslie J. Paperner
*Attorney, Agent, or Firm*—Oblon, Fisher, Spivak, McClelland & Maier

[57]  ABSTRACT

A power steering mechanism including an actuator having two actuating chambers operatively connected to vehicle wheels, a changeover control valve for alternatively connecting one actuating chamber to a pump and for connecting the other actuating chamber to a reservoir depending upon the direction of rotation of the steering wheel. A reaction means transmits a rotating resistance to the steering wheel in accordance with the discharging pressure of the pump, while various means are disposed within the connecting passageway for controlling the flow of fluid in an amount which is proportional to the vehicle speed, whereby the sudden restoration of the steering wheel, when the vehicle is running at a high rate of speed, is prevented.

4 Claims, 4 Drawing Figures

3,831,700

POWER STEERING MECHANISM

BACKGROUND OF THE INVENTION

The present invention relates generally to steering mechanisms, and more particularly to improved power steering mechanisms for providing safer steering at all vehicle speeds, and especially at high vehicle speeds.

SUMMARY OF THE INVENTION

It is an object of the present invention to provide an improved power steering mechanism for providing a moderate steering resistance even at a high speed of the vehicle.

It is another object of the present invention to provide an improved power steering mechanism which will not rapidly restore the wheels of the vehicle at a high speed.

BRIEF DESCRIPTION OF THE DRAWINGS

Various other objects, features and attendant advantages of this invention will be more fully appreciated as the same becomes better understood from the following detailed description when considered in connection with the accompanying drawings, wherein like reference characters designate like or corresponding parts throughout the several views and wherein.

DESCRIPTION OF THE ILLUSTRATED EMBODIMENTS

Figure 1:
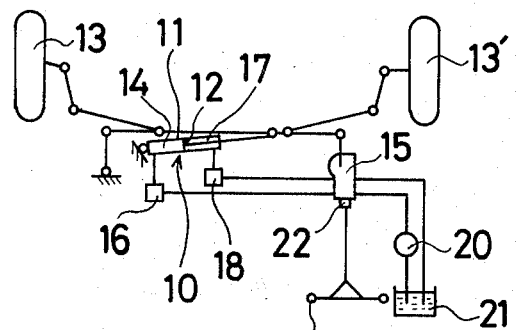
FIG. 1 is a schematic view of a power steering mechanism constructed according to this invention.

Referring now to the drawings, and more particularly to FIG. 1 thereof, a first embodiment of the invention will be described hereinbelow in detail. In this Figure, a fluid actuator, generally indicated by the reference character 10, comprises a fixed cylinder housing 11 and a piston 12, slidably fitted within the cylinder housing 11, which is operatively connected to wheels 13 and 13' by a linkage mechanism for shifting the wheels 13 and 13' by the sliding movement thereof. A first actuating chamber 14 of the actuator 10 is fluidically connected to a changeover control valve 15 through a variable orifice means 16 while a second chamber 17 thereof is fluidically connected to the changeover control valve 15 through a variable orifice means 18. The two variable orific means 16 and 18 are constructed such that the resistance against the fluid flow between the actuating chamber 14 and the changeover control valve 15, or the actuating chamber 17 and the changeover control valve 15, is increased proportional to the increase in the vehicle speed.

During the non-rotating state of a steering wheel 19, the changeover control valve 15 connects the first actuating chamber 14 of the actuator 10 to a pump 20 and a reservoir 21 through the variable orifice means 16, and connects the second actuating chamber 17 thereto through the variable orifice means 18. During the leftwardly rotating state of the steering wheel 19, however, the changeover control valve 15 connects the actuating chamber 14 of the actuator 10 only to the pump 20 through the variable orifice 16, and connects the actuating chamber 17 only to the reservoir 21 through the variable orifice 18. Similarly, during the rightwardly rotating state of the steering wheel 19, the changeover control valve 15 connects the actuating chamber 14 of the actuator 10 only to the reservoir 21 through the variable orifice means 16 and connects the actuating chamber 17 only to the pump 20 through the variable orifice means 18. During the leftwardly rotating state of the steering wheel 19, the pressure within the flow path from the changeover control valve 15 to the variable orifice means 16, that is to say, the rotating resistance proportional to the discharging pressure of the pump 20 operates against the leftward rotation of the steering wheel 19 by means of a reaction means 22, while during the rightwardly rotating state of the steering wheel 19, the pressure within the flow path from the changeover control valve 15 to the variable orifice means 18, that is to say, the rotating resistance proportional to the discharging pressure of the pump 20, operates against the rightward rotation of the sterring wheel by means of the reaction means 22.

Since the fluid discharged from the pump 20 is again returned to the reservoir 21 by the changeover control valve 15 during the non-rotating state of the steering wheel 19, as in the above mentioned construction, the high pressure does not generate within the two actuating chambers 14 and 17 of the actuator 10, and the piston 12 of the actuator 10 does not slide, for the pressure within the two actuating chambers 14 and 17 is the same. Therefore, the wheels 13 and 13' are not shifted. However, during the leftward rotating state of the steering wheel 19, the fluid discharged from the pump 20 is sent to the actuating chamber 14 through the variable orifice means 16, and the pressure within the actuating chamber 14 is increased, so that the piston 12 of the actuator 10 is slidably moved in the rightward direction as the pressure of the actuating chamber 14 is greater than that within the actuating chamber 17.

Therefore, the wheels 13 and 13' are moved toward the left. In that state, the fluid within the actuating chamber 17 of the actuator 10 is discharged from the changeover control valve 15 to the reservoir 21 after passing through the variable orifice means 18 and the pressure within the flow path from the changeover valve 15 to the variable orifice means 16, namely, the rotating resistance proportional to the discharging pressure of the pump 20, operates against the leftward rotation of the steering wheel 19 by means of the reaction means 22. Similarly, during the rightward rotation of the steering wheel 19, the fluid discharged from the pump 20 is sent to the actuating chamber 17 of the actuator 10, through the variable orifice means 18, by the changeover control valve 15, and the pressure within the actuating chamber 17 is thereby increased, such that the piston 12 of the actuator 10 is slidably moved in the leftward direction as the pressure of the actuating chamber 17 is greater than that of the actuating chamber 14. Therefore, the wheels 13 and 13' are moved toward the right. In that state, the fluid within the actuating chamber 14 of the actuator 10 is discharged from the changeover control valve 15 to the reservoir 21 after passing through the variable orifice means 16, and the pressure within the flow path from the changeover control valve 15 to the variable orifice means 18, namely, the rotating resistance proportional to the discharging pressure of the pump 20, operates against the rightward rotation of the steering wheel 19 by means of the reaction means 22. The rotating resistance created by the reaction means 22 against the right and leftward rotation of the steering wheel 19 is a steering resistance. The variable orifice means 16 and 18 increase the resistance against the flow to a level which is proportional to the increase in the vehicle speed, so that there is a proper steering resistance even when the vehicle runs at high speed, that is, when the vehicle runs at high speed, the resistance between the wheels 13 and 13′ and the road surface becomes small, but the resistance against the flow of fluid through the variable orifices 16 and 18 is large. During the leftward rotation of the steering wheel 19, for example, the resistance against the flow of fluid through the variable orifice means 18 is large, so that pressure occurs within the actuating chamber 17 of the actuator 10. Therefore, the pressure occuring within the actuating chamber 14 of the actuator 10 must be increased so that the piston is slidably moved only against the resistance between the wheels 13 and 13′ and road surface, and since the resistance against the flow of fluid through the variable orifice means 16 is large, that large pressure occurs within the flow path from the changeover control valve 15 to the variable orifice means 16. Accordingly, the large steering resistance operates against the leftward rotation of the steering wheel 19. When the vehicle runs at high speed, the resistance against the flow of fluid through the two variable orifice means 16 and 18 is large, so that when the hands of the operator are relaxed or removed from the steering wheel 19, the wheels 13 and 13′ are subject to restoration by its restoration force, the sudden restoration of the wheels however being arrested by means of the actuator 10 which serves as a damper.

Figure 2:
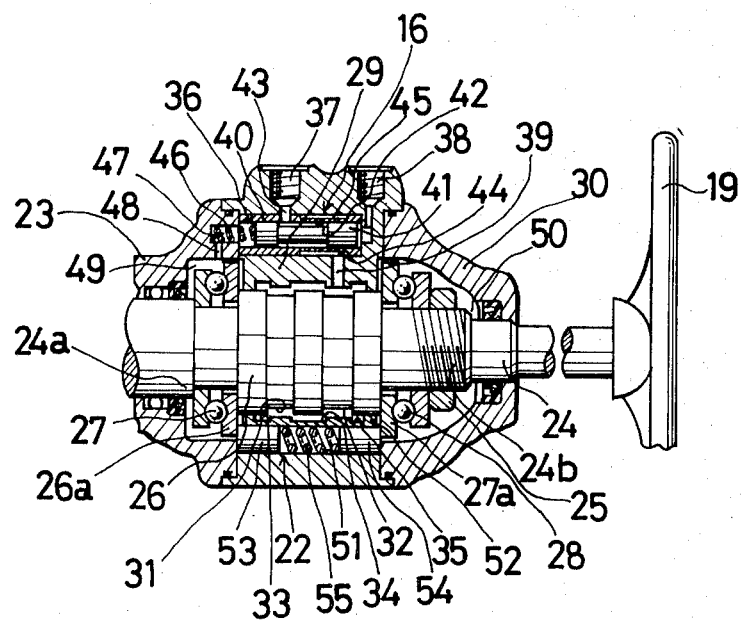
FIG. 2 is a sectional view of a reaction means used in the mechanism of FIG. 1.

Referring now to FIG. 2, the two variable orifice means 16 and 18, the changeover control valve 15, and the reaction means 22 will now be described hereinbelow in detail. A steering gear housing 23 contains a handle shaft 24 which is rotatably mounted and axially movable within steering gear housing 23. The steering wheel 19 is fixed to the right edge of the handle shaft 24 and a nut, not shown, is formed upon the left edge thereof, the nut being screwed to another nut, also not shown, shaft 24 being snapped at a sector gear, not shown, which is operatively connected to the wheels 13 and 13′ through the linkage mechanism, such that when the steering wheel 19 is rotated towards the left the handle shaft 24 is moved accordingly, and when the steering wheel 19 is rotated toward the right the handle shaft 24 is likewise moved toward the right. A shoulder 24a is formed upon the steering shaft 24 and a nut 25 is screwed upon threaded portion 24b formed thereon. An inner valve 26 is supported by bearings 27 and 28, while an outer valve 29 is coaxial with inner valve 26, both valves being disposed between the steering gear housing 23 and a cover 30. Two annular grooves 31 and 32 are axially formed upon the outer surface of the valve 26, while three annular grooves 33, 34 and 35 are axially formed upon the inner surface of the valve 29. The annular grooves 31 and 35 are connected to the reservoir 21 through a flow path not shown, formed upon the outer valve 29 while the annular groove 34 is connected to the pump 20 through a flow path, also not shown, mounted upon the outer valve 29.

An axially extending hole 36, radially extending ports 37 and 38 which are connected to the axially extending hole 36, and a radially extending flow path 39, which connects the axially extending hole 36 to the annular groove 32, are all formed within the outer valve 29, port 37 being connected to actuating chamber 14. A valve bushing 40 is interposed within the hole 36 and a valve spool 41 is slidably inserted within the valve bushing 40, an annular groove 42 being formed upon the outer circumference of the valve spool 41. A radially extending flow path 43 connects the port 37 to the annular groove 42, while an annular groove 44, formed upon the outer surface of bushing 40 is connected to another radially extending flow path 39, a plurality of orifices 45, disposed within valve bushing 40, connecting the annular groove 44 to the annular groove 42. The fluid pressure, increasing proportionately with the increase in vehicle speed, is supplied to the port 38, while the valve spool 41 is urged toward the right by a coil spring 46. A chamber 47, which houses the spring 46 is connected to a gap 49 within the steering gear housing 23 by a radially extending flow path 48 mounted within the steering gear housing 23, the gap 49 and a gap 50 being connected to the reservoir 21 by another flow path, not shown. The port 38 may be connected, for example, to a conventional governor for regulating the fluid pressure in accordance with the vehicle speed via a moderating passage, not shown.

Not shown in FIG. 2 is a hole disposed opposite hole 36, two ports disposed opposite ports 37 and 38, and a flow path connecting the hole disposed opposite hole 36 to the annular groove 31, all of which are formed within the outer valve 29, and the port disposed opposite port 37 being connected to the actuating chamber 17. A valve bushing is interposed within the hole disposed opposite hole 36, a valve spool is inserted within the valve bushing, an annular groove is formed upon the outer circumference of the valve spool, a flow path connects the port disposed opposite the port 37 to the annular groove formed upon the outer circumference of the valve spool an annular groove formed upon the outer surface of the bushing is connected to another flow path for connection with the annular groove 31, and a plurality of orifices disposed within the bushing connect the groove formed upon the bushing to the annular groove formed upon the outer circumference of the valve spool. The fluid pressure, increasing proportionately with the increase in vehicle speed, is supplied to the port disposed opposite port 38, while the valve spool is urged toward the right by a coil spring. A chamber which houses the spring is joined to the gap 49. An axially extending hole 51 and a flow path connecting the center of the hole 51 to the annular groove 34 are formed within the outer valve 29, while two reaction pistons 53 and 54 are disposed within the hole 51, a neutral spring 55 being disposed between the two reaction pistons 53 and 54. When all of the annular grooves 31, 32, 33, 34 and 35 are joined, an end surface of the reaction piston 53 contacts the steering gear housing 23 and the bearing race 26a of the inner valve 26, while an end surface of the reaction piston 54 contacts the cover 30 and the bearing race 27a.

The operation of the power steering mechanism will now be described. During the non-rotating state of the steering wheel 19, all of the annular grooves 31, 32, 33, 34 and 35 are joined or open and the fluid sent from the pump 20 is permitted to return to the reservoir 21 via the annular grooves 31, 33, 32 and 35. During the leftward rotating state of the steering wheel 19, however, the handle shaft 24 is moved toward the left by threaded engagement with the nut 25 whereby the annular grooves 31, 32, 34 and 35 are not joined, or opened, so the the fluid forwarded from the pump 20 to the annular groove 34 is supplied to the port 37 which in turn supplies the same to the actuating chamber 14 of the actuator 10 via the annular groove 32, the flow path 39, the annular groove 44, the orifices 45, the annular groove 42 and the flow path 43, pressure occurring within the first actuating chamber 14 whereby the piston 12 is slidably moved toward the right of FIG. 1. Therefore, the wheels 13 and 13' are shifted toward the left. The fluid of the actuating chamber 17 is discharged from the annular groove 33 to the reservoir 21 via the port disposed opposite the port 37, the flow path connecting the port to the valve bushing, the annular groove formed upon the outer circumference of the valve spool, the orifices provided upon the valve bushing, and the flow path connecting the annular groove formed upon the bushing to the annular groove 31. When the steering wheel is rotated toward the right, an operation contrary to the above-mentioned operation is attained, a description of such operation being omitted for the sake of brevity.

Furthermore, during the leftward rotating state of the steering wheel 19, when the vehicle runs at a low speed, the fluid pressure supplied to the port 38 is low and consequently the valve spool 41 is positioned, by spring 46, so as not to close the orifices 45, the resistance of flow by the plurality of orifices 45 being consequently small. However, the fluid pressure supplied to the port 38 becomes high with an increase in vehicle speed. Accordingly, the valve spool 41 will be gradually shifted toward the left as the vehicle speed increases, the number of the orifices 45 being closed by the valve spool 41 being increased, and the resistance against fluid flow being increased. Therefore, the operation described with reference to FIG. 1 is attained.

The embodiment described heretofore is of the semi-integral type. The present invention however is not so limited, but is capable of use with a linkage type and an integral type of mechanism.

Figure 3:
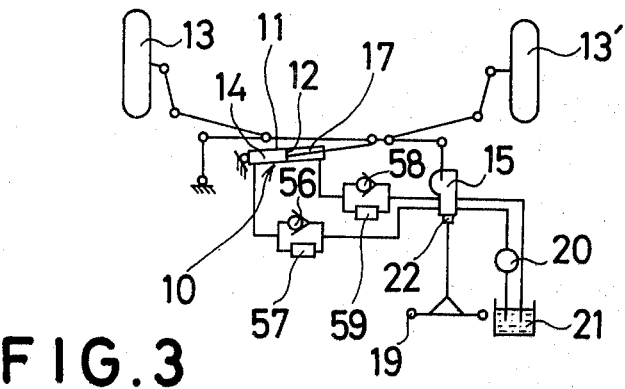
FIG. 3 is a view similar to that of FIG. 1, illustrating, however, a second embodiment of the invention.

Referring now to FIG. 3, a one-way check valve 56, which only allows flow from the changeover control valve 15 to the actuating chamber 14, and a pressure control valve 57 which allows flow from the actuating chamber 14 to the changeover control valve 15 are situated in parallel within the flow path connecting the actuating chamber 14 to the changeover control valve 15. Similarly, a one-way check valve 58 which only allows flow from the changeover control valve 15 to the actuating chamber 17, and a pressure control valve 59 which allows flow from the actuating chamber 17 to the changeover control valve 15 are likewise situated in parallel within the flow path connecting the actuating chamber 17 to the changeover control valve 15. The two pressure control valves 57 and 59 are constructed such that the force required for pressing the respective valve member to the respective valve seat increases proportional to an increase in vehicle speed.

During the non-rotating state of steering wheel 19 the discharging port of the pump 20 is joined to the reservoir 21, while during the leftward rotation of the steering wheel 19, the discharging port of the pump 20 is connected to the actuating chamber 14 of the actuator 10 through the changeover control valve 15 and the check valve 56, and the actuating chamber 17 is connected to the reservoir 21 through the pressure control valve 59 and the changeover control valve 15. During the rightward rotation of the steering wheel 19, the discharging port of the pump 20 is joined to the actuating chamber 17 of the actuator 10 through the changeover control valve 15 and the check valve 58, and the actuating chamber 14 is joined to the reservoir 21 through the pressure control valve 57 and the changeover control valve 15. The rotating resistance according to the discharging pressure of the pump 20, is transmitted to the steering wheel 19 via the reaction means 22.

During the non-rotating state of the steering wheel 19, the fluid discharged from the reservoir 21 by the pump 20 is again returned to the reservoir 21 by the changeover control valve 15 and the two actuating chambers 14 and 17, and because the same pressure exists in both chambers, the piston 12 does not slidably move. Therefore, the wheels 13 and 13' are not shifted. During the leftward rotating state however, the fluid discharged from the pump 20 is supplied to the actuating chamber 14, through the check valve 56, by the changeover control valve 15 whereby the pressure within the actuating chamber 14 is increased to a level greater than that of the actuating chamber 17, and consequently, the piston 12 is slidably moved towards the right. Accordingly, the wheels 13 and 13' are shifted towards the left. In this state, the fluid within the actuating chamber 17 is discharged to the reservoir 21 through the pressure control valve 59 and the changeover control valve 15 by the sliding movement of the piston 12. The rotating resistance, according to the discharging pressure of the pump 20, operates against the leftward rotation of the steering wheel 19 via the reaction means 22. Similarly, during the rightward rotation of the steering wheel 19 the fluid discharged from the pump 20 is supplied to the actuating chamber 17 of the actuator 10, through the check valve 58, by the changeover control valve 15, whereby the pressure within the actuating chamber 17 becomes greater than that within the actuating chamber 14, and consequently, the piston 12 is slidably moved toward the left, causing the wheels 13 and 13' to be shifted toward the right. In this state, the fluid within the actuating chamber 14 of the actuator 10 is discharged to the reservoir 21 through the pressure control valve 57 and the changeover control valve 15 by the sliding movement of the piston 12, and the rotating resistance, according to the discharging pressure of the pump 20, operates against the rightward rotation of the steering wheel 10. The rotating resistance which operates against the right and left rotation of the steering wheel 19, that is, the steering resistance, is maintained even at a high speed of the vehicle, for the force required to depress the respective valve members of the pressure control valves 57 and 59 to their valve seats increases proportionately as the vehicle speed increases.

For example, during the leftward rotating state of the steering wheel 19, the fluid discharged from the pump 20 is supplied to the actuating chamber 14 of the actuator 10 through the changeover control valve 15 and the check valve 56, whereby the pressure within the actuating chamber 14 becomes greater than that within the actuating chamber 17, and consequently the piston 12 is moved toward the right, causing the wheels 13 and 13' to be shifted toward the left. The fluid within the actuating chamber 17 is discharged to the reservoir 21 through the pressure control valve 59 and the changeover control valve 15, but the force required for depressing the respective valve members of the pressure control valves 57 and 59 to their valve seats increases proportional to an increase in vehicle speed, so that the necessary pressure within the actuating chamber 17 is higher at a high speed of the vehicle than at a low speed of the vehicle. When the resistance between the wheels 13 or 13' and the road surface is decreased at a high speed of the vehicle, larger pressure occurs within the actuating chamber 17 than that which occurs at a low speed, so that the pressure of the actuating chamber 14, namely, the discharging pressure of the pump 20, becomes necessarily high. Therefore, the large steering resistance is transmitted to the steering wheel 19 by the reaction means 22. When the hands of the operator are released from the steering wheel 19 after desired rotation of the steering wheel 19 toward the left, the wheels 13 and 13' are subjected to restoration by its restoring force, but the fluid within the actuating chamber 14 must be discharged to the reservoir 21 through the pressure control valve 57 and the changeover control valve 15 in order to restore the steering wheel to its non-rotated position. However, since the force for depressing the respective valve members of the pressure control valves 57 and 59 is large, the fluid within the actuating chamber 14 can not be discharged merely by the restoring force of the wheels 13 and 13'. Therefore, the wheels 13 and 13' are not restored automatically, but they can be restored by manually turning the steering wheel 19 toward the right.

Figure 4:
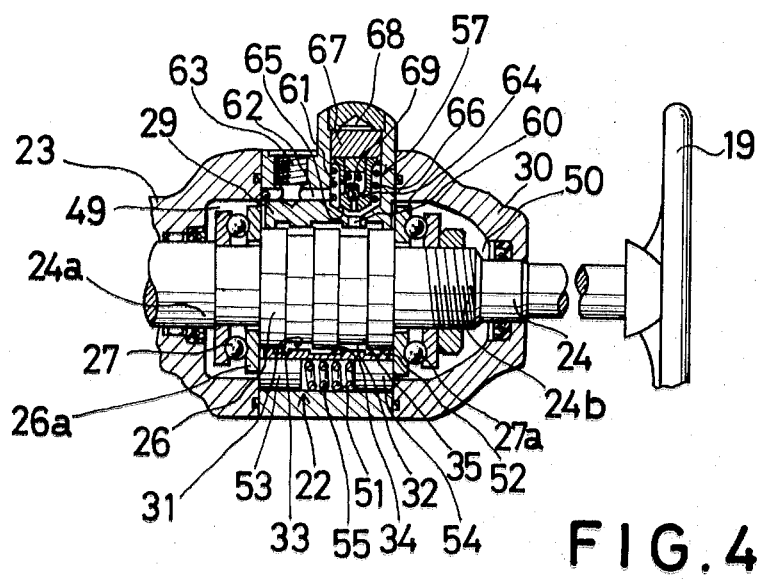
FIG. 4 is a view similar to that of FIG. 2, illustrating, however, a reaction means used in the mechanism of FIG. 3.

Referring now to FIG. 4, the annular groove 32 has associated therewith passageways 60, 61, 62 and 63 which are formed within the outer valve 29, and the annular groove 31 has associated therewith a passageway, not shown, for connection to the actuating chamber 17. A valve member 64, situated within passageway 61, is urged from a valve seat 65, formed within the outer valve 29, to its unseated position by a coil spring 66 which is also interposed within the passageway 61, and a piston 67 is provided for depressing the valve member 64 toward its valve seat 65 against the spring 66 by means of the pressure within a chamber 68. The pressure, proportional to an increase in vehicle speed, is supplied to the chamber 68 and the force required for depressing the valve member 64 to the valve seat 65 is accordingly increased proportionately to the increase in the vehicle speed. When the fluid flows from the passageway 61 to the passageway 60, that is, when the fluid within the actuating chamber 14 of the actuator 10 flows to the reservoir 21, the fluid flows only when the pressure within the actuating chamber 14 of the actuator 10 becomes great enough to cause the valve member 64 to become unseated from the valve seat 65 against the force depressing the valve member 64 to the valve seat 65. However, when the fluid flows from the passageway 60 to the passageway 61, a check valve 69, formed upon the inner portion of the valve member 64, permits the fluid to flow regardless of the force depressing the valve member 64 to the valve seat 65. The above-mentioned valve construction is interposed within a passageway, not shown, formed within the outer valve 29 for connecting the annular groove 31 to the actuating chamber 17 of the actuator 10.

Obviously many modifications and variations of the present invention are possible in light of the above teachings. It is to be understood, therefore, that within the scope of the appended claims, the invention may be practiced otherwise than as specifically described herein.

What is claimed as new and desired to be secured by letters patent of the United States is:

1. A power steering mechanism comprising:
   an actuator having two actuating chambers and operatively connected to the vehicle steering wheels;
   a changeover control valve for connecting one actuating chamber to a reservoir through a first passageway, and for connecting the other actuating chamber to a pump through another passageway, depending upon the direction of rotation of a steering wheel;
   a reaction means for causing the rotating resistance to be transmitted to said steering wheel in accordance with the discharge pressure of said pump; and
   means interposed within said two passageways for controlling the flow of fluid within said two passageways to be proportional to an increase in said vehicle speed, whereby great steering resistance is applied to said steering wheel and the sudden restoration of said steering wheel, when said vehicle is operated at a high rate of speed, is prevented.

2. The power steering mechanism as set forth in claim 1, wherein said means for controlling the flow of fluid comprises variable orifices for creating a large resistance against a flow within said two passageways.

3. The power steering mechanism as set forth in claim 1, wherein said means for controlling the flow of fluid comprises check valves for allowing a flow from said changeover control valve to said actuating chambers only, and pressure control valves for allowing said flow from said actuating chambers to said changeover control valve.

4. The power steering mechanism as set forth in claim 1, wherein said reaction means comprises an axially extending hole formed within an outer valve, two reaction pistons disposed within said hole, and a neutral spring disposed between said two reaction pistons.

* * * * *